United States Patent
Tachi et al.

(10) Patent No.: US 6,749,915 B2
(45) Date of Patent: Jun. 15, 2004

(54) LABELED RESIN BOTTLE

(75) Inventors: Kazuhisa Tachi, Kawasaki (JP); Mikihiko Fujiwara, Kawasaki (JP); Takatoshi Nishizawa, Kashima-gun (JP); Masaki Shiina, Kashima-gun (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 10/052,565

(22) Filed: Jan. 23, 2002

(65) Prior Publication Data

US 2002/0150706 A1 Oct. 17, 2002

Related U.S. Application Data (63) Continuation-in-part of application No. PCT/JP00/04875, filed on Jul. 21, 2000.

(30) Foreign Application Priority Data

Jul. 23, 1999 (JP) .......................... 11-208939
Aug. 6, 1999 (JP) .......................... 11-223583

(51) Int. Cl.[7] .................. B29D 22/00; B29D 23/00; B32B 1/08
(52) U.S. Cl. ................ 428/36.9; 428/36.91; 428/36.92; 428/35.7; 428/156; 428/212; 428/213; 428/215; 428/220
(58) Field of Search ............. 428/35.9, 36.9, 428/36.91, 36.92, 500, 156, 167, 212, 213, 215, 216, 218, 220; 220/672, 675, 62.12, 62.14, 62.15, 62.22; 526/348.2, 348.6

(56) References Cited

U.S. PATENT DOCUMENTS 5,254,302 A * 10/1993 Yamanaka .................. 264/129
6,431,401 B1 * 8/2002 Giblin et al. ................ 222/109
2001/0039320 A1 * 11/2001 Jacobsen et al. ......... 526/348.2
2002/0148843 A1 * 10/2002 Shen et al. .................. 220/672

FOREIGN PATENT DOCUMENTS

| CN | 1043508 | 6/1999 | |
|---|---|---|---|
| EP | 0 254 923 A2 * | 3/1988 | ............. G09F/3/02 |
| EP | 0 374 695 | 6/1990 | |
| JP | 2-214709 | 8/1990 | |
| JP | 5-42944 | 2/1993 | |
| JP | 05042944 A * | 2/1993 | ........... B65D/23/00 |
| JP | 7-276482 | 10/1995 | |
| JP | 07276482 A * | 10/1995 | ........... B29C/49/24 |
| JP | 8-337237 | 12/1996 | |

* cited by examiner

Primary Examiner—Harold Pyon
Assistant Examiner—Michael C. Miggins
(74) Attorney, Agent, or Firm—Oblon, Spivak, McClelland, Maier & Neustadt, P.C.

(57) ABSTRACT

A labeled resin bottle containing a resin bottle and one or more labels placed thereon and fused therewith, wherein said resin bottle has a value of $W/(V^{2/3})$ within a range from 0.1 to 0.5 m, wherein W is a base weight, and V is a fill-in volume, provided that when the value is 0.1 or larger and smaller than 0.3, the bottle has a major thick layer consisting of a polyolefinic resin having a stiffness of 5,000 kgf/cm$^2$ or below, and wherein said label has a tensile elastic modulus of 5,000 to 30,000 kgf/cm$^2$. The labeled resin bottle is capable of withstanding reduced bottle strength while thinning the resin bottle and reducing the amount of source resins used therefor.

23 Claims, 6 Drawing Sheets

LABELED RESIN BOTTLE

BACKGROUND OF THE INVENTION

1. Field of the Invention

The present invention relates to a labeled resin bottle, and, in particular, to a labeled resin bottle which affords an acceptable bottle strength even with reduced resin bottle thickness, and which provides a reduced amount of source resins therein to thereby provide reduced environmental impact.

2. Description of the Background

Resin bottles, noted for their relatively light weight and strength against drop impact, have been widely used for bottles for containing shampoo, rinse, various detergents, cosmetics and food. These bottles are, however, bulky after being emptied, and consequently disposed bottles account for a relatively large portion of wastes and present a serious environmental problem.

To address this problem, intensive efforts have been made for reducing and thinning of resin bottles to thereby reduce the amount of source resins used therein as well as the volume of disposed bottles. While thinning and weight reduction by reducing the base weight of the resin bottles can be attained to a certain extent by technical efforts in molding or processing, such thinning and weight reduction causes the strength of the resin bottles to decrease. Thinning and weight reduction of the resin bottles, for example, for shampoos, rinses or detergents results in lowered buckling strength, which causes undesirable deformation of the bottles during filling of the contents, during transportation or storage in a stacked manner, or during use thereof. These disadvantages have prevented resin bottles from being thinned or reduced in weight to a desirable level.

It has been considered that resin bottles might be further thinned and reduced in weight, while accepting a reduced buckling strength, in order to be used as a substitute for a standing pouch. Standing pouches currently available exhibit excellent volume reduction after use but are poor in rigidity of the barrel portion thereof, so that such pouches still suffer from various problems. For example, they are unbalanced and very inconvenient to handle when the contents thereof are transferred into other containers such as other resin bottles, wherein special compartments or reinforcements for cartons are required for enclosing or packaging thereof for storage and/or transportation. Thinning and weight reduction of the resin bottles to a base weight level of the standing pouches can, however, considerably reduce the drop impact strength and buckling strength, which may even ruin the self-standing property. Unfortunately, no success has been achieved in developing resin bottles which successfully cope with the foregoing problems in conventional standing pouches and which can be substituted for the self-standing pouches.

Thus, a need exists for a labeled resin bottle which can successfully withstand reduced bottle strength while reducing the base weight of the resin bottle to facilitate volume reduction at disposal. More specifically, a need exists for a labeled resin bottle unlikely to deform by virtue of large buckling strength during filling, transportation or storage in a stacked manner, or during use thereof. A need also exists for a labeled resin bottle which exhibits excellent handling to a level suffient to replace the conventional self-standing pouch and which exhibits an appropriate buckling strength and drop impact strength.

SUMMARY OF THE INVENTION

Accordingly, it is an object of the present invention to provide a labeled resin bottle having placed and fused thereon a label having a specific range of tensile elastic modulus.

It is, moreover, a specific object of the present invention to provide a labeled resin bottle containing a resin bottle and having a label placed thereon and fused therewith, wherein the resin bottle has a value of $W/(V^{2/3})$ within a range from about 0.1 to 0.5, wherein W is a base weight thereof, and V is a fill-in volume, provided that when the value is about 0.1 or larger and smaller than about 0.3, the bottle has a major thick layer consisting essentially of a polyolefinic resin having a stiffness of about 5,000 $kgf/cm^2$ or below, and wherein the label has a tensile elastic modulus of about 5,000 to 30,000 $kgf/cm^2$.

DETAILED DESCRIPTION OF THE PREFERRED EMBODIMENTS

The present invention relates to a structure in which a label is placed on a resin bottle and fused therewith. For convenience, a description will individually be provided below for the resin bottle and label in this order.

At the outset, it is noted that each notation in this specification expressing a numerical range using "to" indicating a numerical range includes values expressed by the numerals before and after "to" as minimum and maximum values, i.e., the ranges are inclusive.

Resin Bottle

The present invention provides a resin bottle having a value of $W/(V^{2/3})$ within a range from about 0.1 to 0.5, wherein W is the base weight thereof (in gram) and V is the fill-in volume (in milliliter). Also provided are resin bottles having a value of $W/(V^{2/3})$ within a range from about 0.3 to 0.5, and those having a value of $W/(V^{2/3})$ within a range from about 0.1 or above and less than about 0.3, which have specific functions.

The resin bottles having a value of $W/(V^{2/3})$ within a range from about 0.3 to 0.5 according to the present invention are particularly valuable as bottles for which a sufficient buckling strength is required at portions other than the barrel portion, which are typically available as bottles for containing shampoo, rinse, various detergents, cosmetics and food. A value of $W/(V^{2/3})$ below about 0.3 will undesirably make the bottles extremely light in weight and thinned as a whole and will readily result in buckling deformation at portions other than the barrel portion on which the label is placed, which are inappropriate for such uses. On the other hand, a value of $W/(V^{2/3})$ exceeding about 0.5 will not be successful in thoroughly reducing the amount of source resins used as compared with that for the conventionally marketed bottles, and will only provide a limited effect of improving the buckling strength of the bottles even if they are attached with the label.

It has been known that the buckling strength of the resin bottle is mainly affected by the thickness, shape and rigidity of the source material, where the deformation process thereof is not uniform, and that the location of where the buckling deformation may start is sensitive to thickness unless the shape of the bottle is unusutal, and the buckling starts at a thin-walled portion where stress is concentrated. That is, the buckling starts at the thin-walled portion, having a large blow-up ratio, such as the barrel portion, shoulder portion and corner portion around the bottom portion rather than the portions having a small blow-up ratio such as the mouth portion and bottom portion.

The resin bottle having a value of $W/(V^{2/3})$ within a range from about 0.3 to 0.5 is preferably thinner at the barrel portion thereof than at the other portions so as to allow buckling deformation to start at the barrel portion, and, in particular, having a primary curved surface which is convenient for placing of the label, even when buckling deformation should occurs. More specifically, the labeled resin bottle preferably contains a mouth/shoulder portion, a barrel portion and a bottom portion; and a ratio of thickness of the barrel portion, preferably composed of a primary curved surface, in respect to a minimum thickness of the mouth/shoulder portion and the bottom portion including a bottom corner portion resides within a range from about 0.1 to 0.9, and more preferably from about 0.2 to 0.8. The thickness ratio of the primary curved surface in the barrel portion within the above range will desirably suppress the share of the barrel portion in the thickness distribution of the resin bottle, and on the contrary raises the share of the shoulder portion and bottom corner portion which otherwise tends to be thinned. This successfully suppresses the buckling at the shoulder portion or the bottom corner portion to thereby more effectively enhance the buckling strength through placing and fusing with the label according to the present invention. On the contrary, a ratio of thickness at the barrel portion of less than about 0.1 will make it difficult to form the bottle and will tend to excessively lower a level per se of the buckling strength of the bottle. The bottle may also have, together with such primary curved surface on the barrel portion for the convenience of the label placement, a handle or other shaped portions including various three-dimensional curved surfaces such as ribs for the purpose of enhancing the buckling strength.

There is no special limitation on the materials for composing the resin bottles having a $W/(V^{2/3})$ value within a range from about 0.3 to 0.5, and examples of which include ethylene homopolymers such as high-density polyethylene, middle-density polyethylene, cotton-like low-density polyethylene and ultra-low-density polyethylene produced using a single-site catalyst; polyolefinic resins such as ethylene-a-olefinic copolymer, branched low-density polyethylene, ethylene-vinyl acetate copolymer and polypropylene; and further include polyethylene terephthalate resin, polyethylene naphthalate resin, polyamide resin, polyvinyl chloride resin, polystyrene-base resin and polycarbonate resin. It is also acceptable to use a resin blend containing a plurality of resins including those not listed in the above, which may also contain inorganic fillers, modifiers, coloring pigments or the like. The layer constitution of the bottle may be of single-layered or multi-layered, and a typical constitution relates to a stack of a barrier resin layer composed of a saponified product of ethylene-vinyl acetate copolymer or polyamide-base resin with an adhesive resin layer adopted for a material for the main layer.

On the other hand, the resin bottle having a value of $W/(V^{2/3})$ within a range from about 0.1 or above and less than 0.3 is particularly useful as a bottle which is replaceable to the conventional self-standing pouch, and more specifically as a bottle for containing refill of shampoo, rinse or the like to be transferred into the foregoing resin bottle. In the present invention, a bottle in which a polyolefinic resin layer having a stiffness of about 5,000 kgf/cm² or below accounts for a major portion in the thickness constitution thereof is used.

The bottle having a value of $W/(V^{2/3})$ within a range from about 0.1 or above and less than 0.3 is preferably made so as to have a relatively large base weight of the resin at the bottom portion including the corner portion around such bottom portion to thereby thicken the wall in order to improve the self-standing property. While the barrel portion of the bottle necessarily has a primary curved surface for the convenience of the label placement, the bottle may also have together therewith other shaped portions having a three-dimensional curved surface, such as ribs or folded grooves, for the purpose of improving the self-standing property or volume-reducing property.

There is no special limitation on the materials for composing the resin bottles having a $W/(V^{2/3})$ value within a range from about 0.1 or above and less than about 0.3 as far as the polyolefinic resin layer having a stiffness of about 5,000 kgf/cm² or below accounts for a major portion in the thickness constitution thereof. Available examples of such materials include ultra-low-density polyethylene containing an ethylene-a-olefinic copolymer of ethylene and $C_{3-10}$ α-olefin, e.g., propylene, 1-butene, 1-pentene, 1-hexene, 4-methyl-1-pentene and 1-octene, linear low-density polyethylene, middle-density polyethylene, branched low-density polyethylene and ethylene-vinyl acetate copolymer.

In terms of improving volume reduction property of the bottle, drop impact strength and ESCR (environmental stress crack resistance) for preventing leakage of the content, particularly preferable examples relate to independent use of an ethylene-α-olefin copolymer having a density of about 0.850 to 0.915 g/cm³, which can be obtained by polymerization using a metallocene-base catalyst (e.g., metallocene-alumoxane catalyst, or a mixture of a metallocene compound and a compound capable of forming a stable anion by reacting therewith as disclosed in International Laid-Open Patent Publication No. WO92/01723; and combined use of such copolymer as a major component typically blended with branched low-density polyethylene or ethylene-vinyl acetate copolymer, both of which being excellent in blow molding property. It is also acceptable to use a resin blend containing a plurality of resins including those not listed in the above, which may also contain inorganic fillers, modifiers, coloring pigments or the like. The layer constitution of the bottle may be of single-layered or multi-layered, and a typical constitution relates to a stack of a barrier resin layer composed of a saponified product of ethylene-vinyl acetate copolymer or polyamide-base resin with an adhesive resin layer adopted for a material for the main layer.

Any of the known blow molding processes is applicable to molding of the resin bottle of the present invention. Available methods include direct blow molding, injection stretching blow molding and stretching blow molding combined with pipe or sheet extrusion, for example.

Label

There is no special limitation on the materials for composing the label used in the present invention, and examples thereof include anything provided they are placeable on the resin bottle and are capable of showing desired effects. Examples of such materials include labels of polyolefinic resins such as polypropylene, propylene-ethylene copolymer, high-density polyethylene, middle-density polyethylene, polymethyl-1-pentene and ethylene-cyclic olefin copolymer; polyamide-base resins such as polyethylene terephthalate resin, polyvinyl chloride resin, nylon-6, nylon-6,6, nylon-6,10 and nylon-6,12; ABS resin and ionomer resins. Among these, most preferable are thermoplastic resins having melting points within a range from about 130 to 280° C., which are typified by polypropylene, high-density polyethylene and polyethylene terephthalate. These resins can be used independently or in combination of two or more thereof.

Using polypropylene-base resins is particularly preferable in the present invention from the aspects of chemical resistance and cost. Such polypropylene-base resins can be exemplified as propylene homopolymers showing an isotactic or syndiotactic stereoregularity, and copolymers composed of propylene as a major component with $\alpha$-olefins such as ethylene, 1-butene, 1-hexene, 1-heptene and 4-methyl-1-pentene. Such copolymers may have any of binary, ternary and quaternary systems, and may be random copolymer of block copolymer.

Other films preferably available in the present invention are such as those comprising the above resin and an inorganic or organic fine powder blended therewith in an amount of about 0.1 to 80 wt %, those being stretched uniaxially or biaxially by any of known processes, those being coated thereon with a latex containing an inorganic filler, and those being deposited or adhered thereon an aluminum layer. It is also acceptable to add dispersion aid, antioxidant, solubilizing agent, UV stabilizer anti-blocking agent and so forth, which are not specifically limited. Examples of the inorganic fine powders available for the label include those made of heavy calcium carbonate, precipitated calcium carbonate, fired clay, talc, barium sulfate, diatom earth, magnesium oxide, zinc oxide, titanium oxide and silicon oxide. Among these, heavy calcium carbonate, fired clay and talc are preferable by virtue of their inexpensiveness and excellent formability. Especially preferable is heavy calcium carbonate.

Examples of the organic fine powders include those made of polyethylene terephthalate, polybutylene terephthalate, polyamide, polycarbonate, polyethylene naphthalate, polystyrene, melamine resin, polyethylene sulfite, polyimide, polyethyl ether ketone and polyphenylene sulfite. It is particularly preferable to use a fine powder having a melting point higher than that of a thermoplastic resin employed, and not compatible therewith.

The label used in the present invention may contain a single species of the foregoing fine powders or two or more species in combination, where the latter case allows combinations of inorganic fine powder and organic fine powder.

The label available in the present invention may have its own function of adhering to the resin bottle, or may be used in combination with another member having a function of allowing such label to adhere on the resin bottle. While the latter case possibly includes use of such label in combination with an adhesive sheet, the present invention prefers use of the label preliminarily being provided with the adhesive function. One possible example of such label is of pressure sensitive type, which contains a base film made of the foregoing resins and a pressure-sensitive adhesive coated thereon, and is placed on a formed bottle using an automatic labeling apparatus. It is also allowable to use a heat-sealing label having a heat-sealing resin layer on a base film.

The heat-sealing label is very advantageous in that it allows label placement at the same time with the molding of the resin bottle in particular in the in-mold forming process. Such kind of label is preferably such that being made of synthetic paper, which is obtained by first forming on one surface of a thermoplastic resin film (a plane to be brought into contact with the resin bottle) containing an inorganic fine powder a heat-sealing resin layer having a melting point lower than that of the source resin of such film to thereby prepare a multi-layered film, and then stretching such multi-layered film at a temperature equal to or higher than the melting point of the heat-sealing resin and lower than the melting point of the thermoplastic resin containing the inorganic fine powder. Materials composing the heat-sealing resin layer include low-to-middle-density polyethylene produced by the high-pressure process and having a density of about 0.900 to 0.935 g/cm$^3$, straight-chain linear polyethylene having a density of about 0.880 to 0.940 g/cm$^3$, ethylene-vinyl acetate copolymer, ethylene-acrylate copolymer, ethylene-alkyl acrylate copolymer, ethylene-alkyl methacrylate copolymer (where the carbon number of the alkyl group is preferably 1 to about 8) and metal salt of ethylene-methacrylate copolymer (preferable metals include Zn, Al, Li, K and Na). Source materials for the heat-sealing resin are preferably selected so as to match the resin composing the bottle proper. It is also preferable to emboss the heat-sealing layer so as to prevent blister from occurring during the in-mold forming.

The tensile elastic modulus (Young's modulus) of the label used in the present invention necessarily resides in a range from about 5,000 to 30,000 kgf/cm$^2$, and more preferably from about 10,000 to 25,000 kgf/cm$^2$. Placing the label having a tensile elastic modulus of less than about 5,000 kgf/cm$^2$ onto the bottle having a W/(V$^{2/3}$) value of about 0.3 to 0.5 results in only a poor effect of improving the buckling strength, and onto the bottle having a W/(V$^{2/3}$) value of about 0.1 or above and less than 0.3 results in only a poor effect of improving the self-standing property. On the contrary, placing the label having a tensile elastic modulus exceeding about 30,000 kgf/cm$^2$ results in only a poor conformability to the primary curved surface of the bottle to thereby undesirably cause wrinkle on the label or increased deformation of the bottle.

The thickness of the label used in the present invention generally resides in a range from about 40 to 250 $\mu$m, and more preferably about 50 to 200 $\mu$m. Placing the label having a thickness less than 40 $\mu$m onto the bottle having a W/(V$^{2/3}$) value within a range from about 0.3 to 0.5 results in only a poor effect of improving the buckling strength, and onto the bottle having a W/(V$^{2/3}$) value of about 0.1 or above and less than 0.3 results in only a poor effect of improving the self-standing property. On the contrary, placing the label having a thickness exceeding about 250 μm onto the bottle tends to result in a poor peeling strength at the boundary portion between the bottle and the label particularly in in-mold labeling process. There is no special limitation on the position on the resin bottle where the label is to be placed so far as necessary improving effects of the buckling strength and self-standing properties can be obtained.

When the label is placed on the resin bottle having a W/($V^{2/3}$) value of about 0.3 to 0.5, the label is preferably placed on a portion including a point on the primary curved surface of the barrel portion where the buckling deformation can occur (starting point of the buckling deformation) when compressive stress is applied from the mouth portion of an unlabeled empty resin bottle. On the other hand, when the label is placed on the resin bottle having a W/($V^{2/3}$) value of about 0.1 or above and less than about 0.3, the label is preferably placed on the primary curved surface of the barrel portion of the resin bottle including at least the lowermost portion of such barrel portion, and is preferably placed substantially on the outer peripheral portion excluding the area around the die parting line when viewed in the barrel section.

In the present invention, three or more discontinuous labels are preferably placed on the resin bottle so as to be aligned along the peripheral direction of the lateral section of the barrel portion, and fused by in-mold forming along the vertical direction of the barrel portion. Thus produced labeled resin bottle is excellent in the vertical compression strength and squashing property, and is successful in improving the buckling strength which is a necessary features during the use or transportation. While sectional form of the barrel portion of such resin bottle is preferably round so as to ensure smooth leakage of air during the in-mold labeling, any other polygonal shape such as triangular or higher may be allowable. The vertical length, or height-wise length, of the barrel portion preferably accounts for a large ratio in respect to the total length of the bottle since a better improving effect of buckling strength is expectable. More specifically, the ratio of length is preferably about 0.5 (50%) or above. The mouth, shoulder and bottom portions of the resin bottle preferably have walls thicker than that of the barrel portion, since such portions are less compatible with the in-mold label and tend to cause buckling.

In such preferred embodiment, the number of placement of the in-mold labels is three or more, and more preferably 3 to 6. The number of labels below 3 results in only an insufficient improving effect of the buckling strength, and too many labels complicates the label inserting process. While the labels were placed on the barrel portion in the above embodiment, it is also allowable in this embodiment to place the labels also on the shoulder and bottom portions as required to thereby further improve the buckling strength. The width of the label is preferably 10 mm or wider so as to prevent the label from curling in the label inserting process. It is preferable that positions of the label placement along the peripheral direction as viewed on the bottle section are evenly arranged depending on the number of such labels. Unbalanced label placement into one direction will cause uneven improvement in the buckling strength only on one side, which may be causative of deformation on the other side when the bottle is compressed. The bottle having a sectional shape of polygons higher than square and having the label placed on the edge thereof preferably has chamfered edges individually having a chamfering radius of 5 mm or above.

In accordance with the present invention, it is also acceptable to intentionally lower the adhesive strength of the label so far as effect of the present invention will not be ruined and the label will not detach during use. Lowering of the adhesive strength may sometimes even advantageous from the viewpoint of classificational waste recycle since such label will more readily be detached from the emptied resin bottle for disposal. Detachment of the label is also beneficial in that further reducing the volume of the resin bottle.

EXAMPLES

The present invention will further be described by reference to certain Examples, Comparative Examples and Test Examples. Materials, amount of use thereof, ratio of use, operations, procedures or the like can properly be modified without departing from the spirit of the present invention. Thus, it is understood that the present invention is by no means limited to the specific examples explained below and that such examples are provided solely for the purposes of illustration.

MFR (melt flow rate) described below in Production Example, Examples and Comparative Examples was measured according to JIS-K-7210, density according to JIS-K-7112, tensile elastic modulus according to JIS-K-7127, and stiffness according to JIS-K-7106.

Production Example 1

Exemplary Production of Label 1

A resin composition "A" containing 67 weight parts of a propylene homopolymer (product of Japan Polychem Corporation, Novatec PP MA-8, m.p. 164° C.), 10 weight parts of a high-density polyethylene (product of Japan Polychem Corporation, Novatec HD HJ580, m.p. 134° C., density =0.960 g/cm$^3$), and 23 weight parts of calcium carbonate powder having a grain size of 1.5 μm was kneaded under fusion using an extruder, extruded from the die at 250° C. in a sheet form, and the obtained sheet was then cooled to approx. 50° C. The sheet was again heated to approx. 150° C., stretched by four times in the longitudinal direction as being effected by difference in the peripheral speeds of a roller group, to thereby obtain a uniaxially stretched film.

A composition "B" containing 51.5 weight parts of a propylene homopolymer (Product of Japan Polychem Corporation; Novatec PP MA-3, m.p. 165° C.), 3.5 weight parts of a high-density polyethylene (ditto, HJ580), 42 weight parts of calcium carbonate powder having a grain size of 1.5 μm and 3 weight parts of titanium oxide powder having a grain size of 0.8 μm was separately kneaded under fusion at 240° C. using a separate extruder, and was then extruded from the die into a film form onto the surface of the foregoing stretched film to thereby obtain a stack (B/A), that is, a stack of surface layer/core layer.

On the other hand, 80 weight parts of an ethylene-1-hexene copolymer obtained by co-polymerizing ethylene and 1-hexene using metallocene-alumoxane catalyst as the metallocene catalyst (1-hexene content=22 wt %, degree of crystallization=30, number average molecular weight=23, 000, m.p. 90° C., MFR=18 g/10 min, density=0.898 g/cm$^3$) and 20 weight parts of a low-density polyethylene obtained by the high-pressure process (m.p.=110° C., MFR=4 g/10 min., density=0.92 g/cm$^3$) were kneaded under fusion at 200° C. using a biaxial extruder, extruded from the die in a strand form, and then cut to thereby obtain pellets (II) for forming the heat-sealing resin layer.

Separately, a composition "C" containing 51.5 weight parts of the propylene homopolymer (ditto, MA-3), 3.5 weight parts of a high-density polyethylene (ditto, HJ580), 42 weight parts of calcium carbonate powder having a grain size of 1.5 µm, and 3 weight parts of titanium oxide having a grain size of 0.8 µm, and the foregoing pellets (II) for forming the heat-sealing resin layer were individually kneaded under fusion at 230° C. using separate extruders, and fed to a single co-extrusion die to thereby stack both components within such die. The stack was then extruded at 230° C. in a film form onto the layer A of the foregoing stack (B/A), that is, a stack of surface layer/core layer, so as to orient the heat-sealing resin layer (II) outward.

Thus obtained four-layered film (B/A/C/II) was then introduced into a tenter oven, heated to 155° C., stretched by 7 times in the transverse direction, heat-set at 164° C. and cooled to 55° C. The obtained film then had the edge slit off, and then had the surface layer (layer B) side treated by corona discharge treatment at 70 W/m²/min, to thereby obtain a four-layered, fine-porous stretched resin film (label 1) having a density of 0.79 g/cm³, thickness of 100 µm (B/A/C/II=30 µm/40 µm/25 µm/5 µm). Thus obtained film was found to have tensile elastic modulus (an average value of those in the longitudinal and transverse directions) of 16,000 kgf/cm².

Production Example 2

Exemplary Production of Label 2

A four-layered, fine-porous stretched resin film (label 2) having a density of 0.91 g/cm³ and a thickness of 100 µm (B/A/C/II=30 µm/40 µm/25 µm/5 µm) was similarly produced as in the exemplary production of label 1, except that the stretching temperatures in the longitudinal and transverse directions were set to 155° C. and 165° C., respectively, and the amount of extrusion of the B/A/C layer from the extruder was properly adjusted. Thus obtained film was found to have tensile elastic modulus (an average value of those in the longitudinal and transverse directions) of 24,000 kgf/cm².

Production Example 3

Exemplary Production of Label 3

A propylene-ethylene copolymer (product of Japan Polychem Corpoartion, Novatec PP FW3E) was kneaded under fusion using an extruder, and extruded at 230° C. in a sheet form. The obtained sheet was cooled to approx. 50° C., then had the edge slit off to thereby obtain a non-stretched film of 100-µm thick. The obtained film was then treated by corona discharge treatment at 70 W/m²/min on both of the front and back surfaces, coated on the back surface thereof with a heat-sealing agent (product of Toyo-Morton Ltd., Adcoat 1790) in a solid amount of 4 g/m² using a bar coater, and dried at 80° C. for one minute to thereby obtain a label (label 3). Thus obtained label was found to have tensile elastic modulus (an average value of those in the longitudinal and transverse directions) of 4,500 kgf/cm².

Examples 1 to 4, and Comparative Examples 1 to 4

Figure 1:
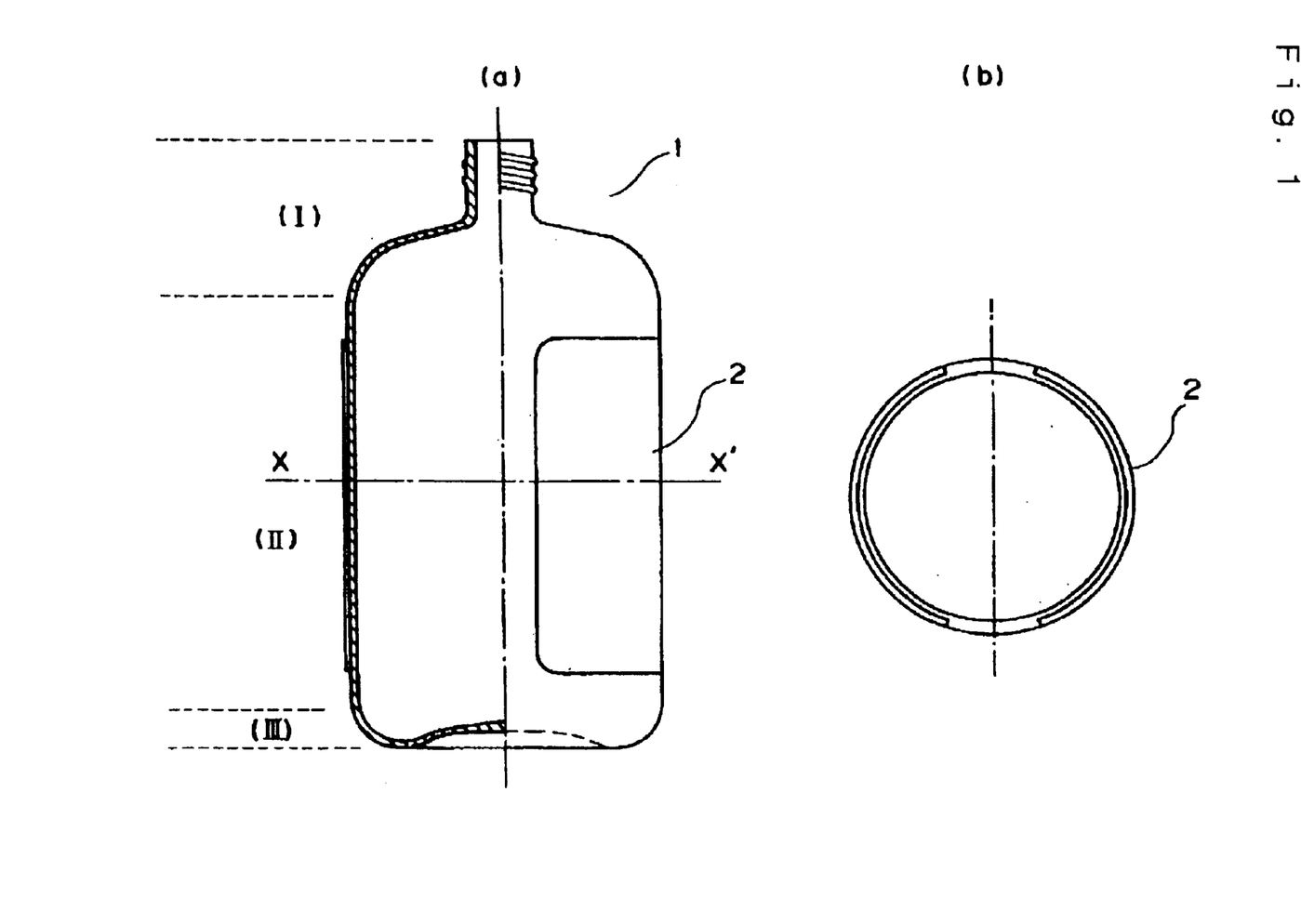
FIG. 1A is a schematic drawing of a 500-ml round resin bottle having a label placed thereon and fused therewith.
FIG. 1B is a sectional view at the barrel portion thereof along the line X–X', where reference numeral 1 represents the resin bottle, 2 represents the label, I represents the mouth/shoulder portion, II represents the barrel portion, and III represents the bottom portion.

In Examples 1 to 4, and Comparative Examples 1 to 4, a single-layered resin bottle was formed by using a high-density polyethylene (product of Japan Polychem Corporation, Novatec HD HB330, MFR at 190° C. under 2.16 kg load=0.35 g/10 min., density=0.953 g/cm³) as material 1 for forming the bottle, and by using a die and a small-sized direct blow molding machine (product of Tahara K.K., model TL5543L) for forming a 500-ml round bottle shown in FIG. 1, where adjustment of the lip distance of the die and parison control were properly effected at 200° C. The bottles in Example 4 and Comparative Example 4 were designed to have different ratios of a minimum thickness of the shoulder and bottom corner portions in respect to that of the barrel portion, where the thickness of the barrel portion was reduced.

In practice, all resin bottles were first produced without the labels placed thereon, measured for the value of thickness ratio of the barrel portion, allowed to stand for one day in a thermostatic chamber conditioned at 23° C., filled with water of 23° C. up to the upper limit of the mouth portion of the bottles, measured for the fill-in volume V (ml) based on the amount of filled water, and the $W/(V^{2/3})$ value was obtained based on such volume V and base weight (g). Results were shown in Table 1.

The individual labels were cut in a size of 70 mm wide and 100 mm long, where the label 1 obtained in Production Example 1 was used in Examples 1, 3 and 4, label 2 obtained in Production Example 2 was used in Example 2, and label 3 obtained in Production Example 3 was used in Comparative Example 3 as shown in Table 1, placed on the inner surface of the cavity of both halves of the parted die corresponding to the barrel portion using an automatic inserter, immobilized on the inner surface of the cavity by air suction through holes provided thereto, and then the individual resin bottles having the labels placed thereon were formed by in-mold forming.

The buckling strength of thus obtained individual bottles was then measured. More specifically, the bottle was allowed to stand in a thermostatic chamber conditioned at 23° C., applied with load at a compression speed of 50 mm/min. using a strograph (product of Toyo Seiki Seisakusho, Ltd.) to thereby obtain a load-strain curve, from which the buckling strength was determined as a maximum load value where the yield load reaches a peak. All buckling deformation were found to start at the barrel portion. Results were shown in Table 1.

The obtained individual bottles were also assessed for their volume reducing properties. The barrel portion of the bottle was squashed by hands, and impression about easiness of the squashing and deformed state were judged referring to the criteria below:

O: the bottle is relatively easy to squash in the barrel portion, and can be flattened to an extent that almost no content volume remains; and X: the bottle is difficult to squash in the barrel portion, and can be deformed only to an extent that the content volume remains almost intact.

Results were listed in Table 1.

Example 5, and Comparative Example 5 and 6

Figure 2:
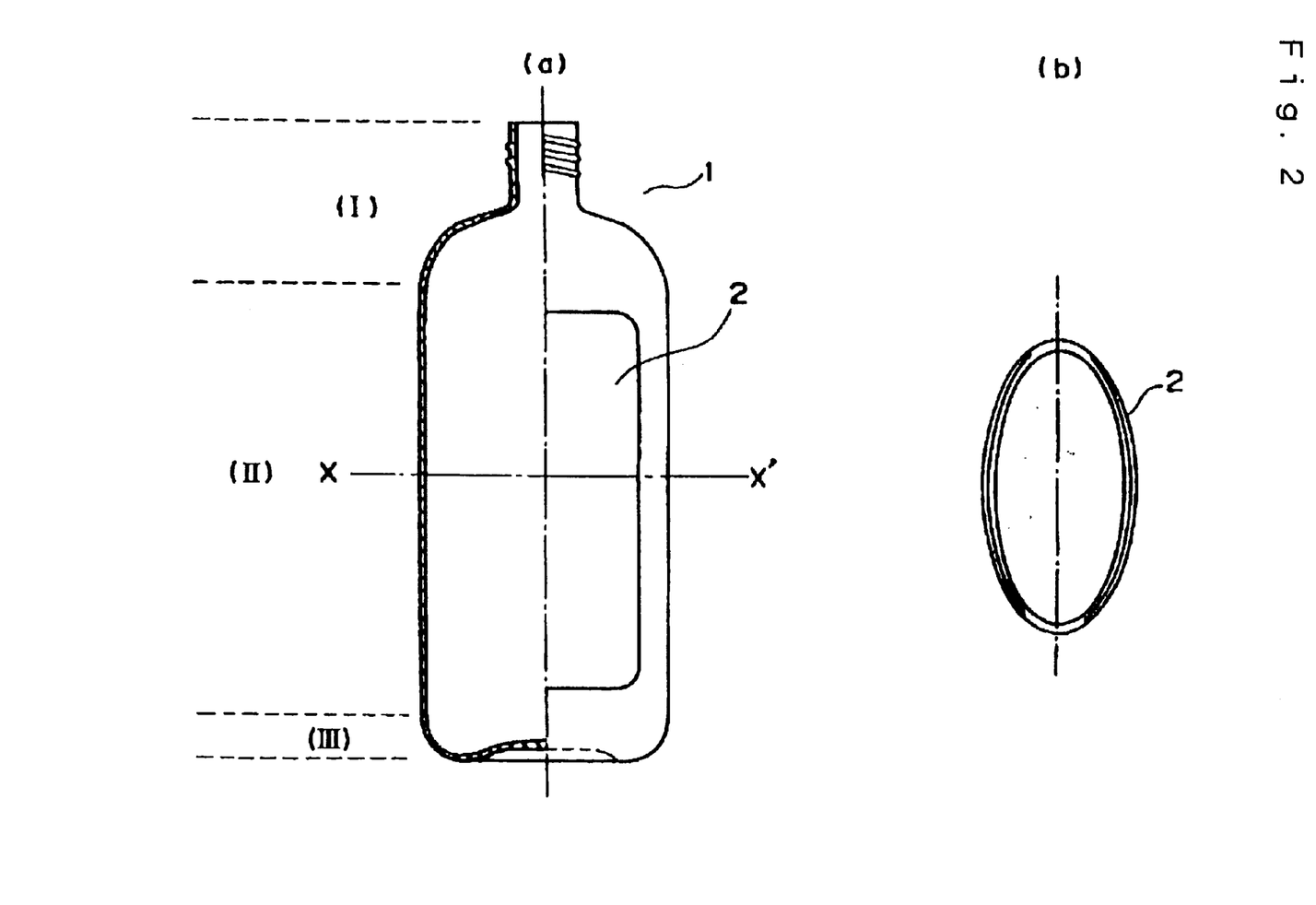
FIG. 2A is a schematic drawing of a 500-ml flat resin bottle having a label placed thereon and fused therewith.
FIG. 2B is a sectional view at the barrel portion thereof along the line X–X'.

In Example 5, and Comparative Examples 5 and 6, a single-layered resin bottle was formed by using a blended composition comprising 75 wt % of an ethylene-propylene random copolymer (product of Japan Polychem Corporation, Novatec PP EG7FT, MFR at 230° C. under 2.16 kg load=1.3 g/10 min.) and 25 wt % of an ultra-low-density polyethylene (product of Japan Polychem Corporation, Kernel KF360, MFR at 190° C. under 2.16 kg load=3.5 g/10 min., density=0.898 g/cm³) as material 2 for forming the bottle, and by using a die and a small-sized direct blow molding machine (product of Japan Steel Works Inc., model JB105) for forming a 500-ml flattened bottle having a longer diameter of the barrel portion of 80 mm and a shorter diameter of 45 mm as shown in FIG. 2, where adjustment of the lip distance of the die and parison control were properly effected at 220° C. Similarly to Example 1, all resin bottles were produced without the labels placed thereon, measured for the value of thickness ratio of the barrel portion, and the $W/(V^{2/3})$ value was calculated based on the obtained fill-in volume V of the bottle and base weight W. Results were shown in Table 1.

In Example 5, the obtained label 1 was cut in a size of 50 mm wide and 80 mm long, and subjected to in-mold forming similarly to Example 1 to thereby produce the resin bottle having such label placed thereon. The buckling strength and volume reducing property of thus obtained individual bottles were then measured similarly to Example 1. Results were shown in Table 1.

Example 6 and Comparative Example 7

Figure 3:
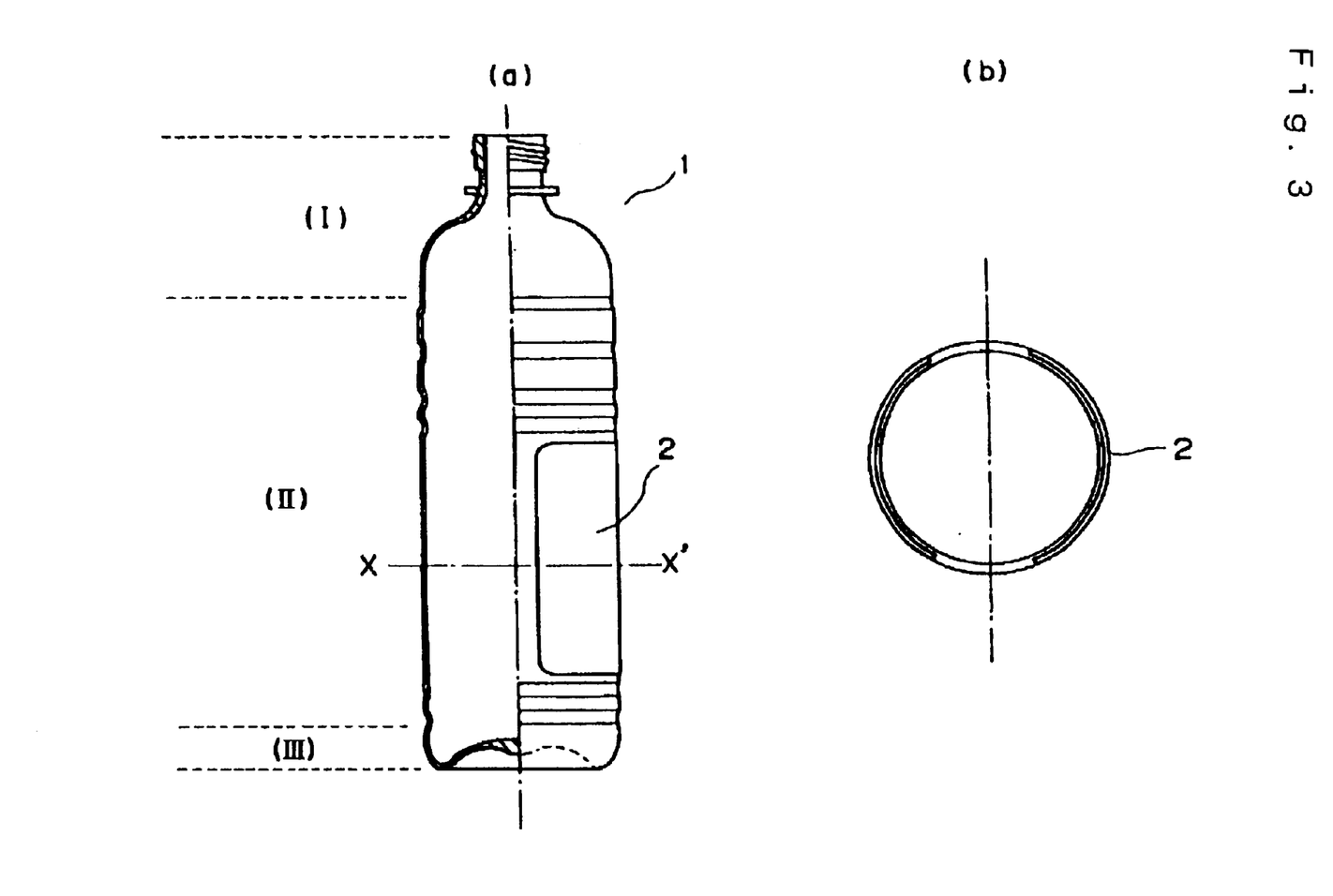
FIG. 3A is a schematic drawing of a 500-ml-capacity, 70-mm-diameter round resin bottle having a label placed thereon and fused therewith.
FIG. 3B is a sectional view at the barrel portion thereof along the line X–X'.

In Example 6 and Comparative Example 7, a test-tube-like preform, or end-closed parison having an outer diameter of 25 mm, height of 65 mm, maximum thickness of 3 mm and weight of 14 g, was formed by using an ethylene-propylene random copolymer (product of Japan Polychem Corporation, Novatec PP MX03B, MFR at 230° C. under 2.16 kg load=30 g/10 min.) as material 3 for forming the bottle, and by using an injection molding machine (Toshiba Machine Co., Ltd., model IS-150E) at an injection molding temperature of 230° C. and a die cooling temperature of 40° C. From such preform, a resin bottle of Example 6 or Comparative Example 7 was formed using a die and an injection stretching blow molding machine (product of Frontier Corporation, model EFB2000) based on the cold parison process for forming a 500-ml flattened bottle having a diameter of the barrel portion of 70 mm as shown in FIG. 3 at a preform heating temperature of 125° C.

In practice, similarly to Example 1, all resin bottles were produced without the labels placed thereon, measured for the value of thickness ratio of the barrel portion, and the $W/(V^{2/3})$ value was calculated based on the obtained fill-in volume V of the bottle and base weight W. Results were shown in Table 1.

In Example 6, the label obtained in the foregoing exemplary synthesis was cut in a size of 60 mm wide and 70 mm long, placed on the inner surface of the cavity of both halves of the parted die corresponding to the barrel portion using an automatic inserter, immobilized on the inner surface of the cavity by air suction through holes provided thereto, and then the individual resin bottles having the labels placed thereon were formed by in-mold forming. The buckling strength and volume reducing property of thus obtained individual bottles were then measured similarly to Example 1. Results were shown in Table 1.

Example 7, and Comparative Examples 8 and 9

Figure 4:
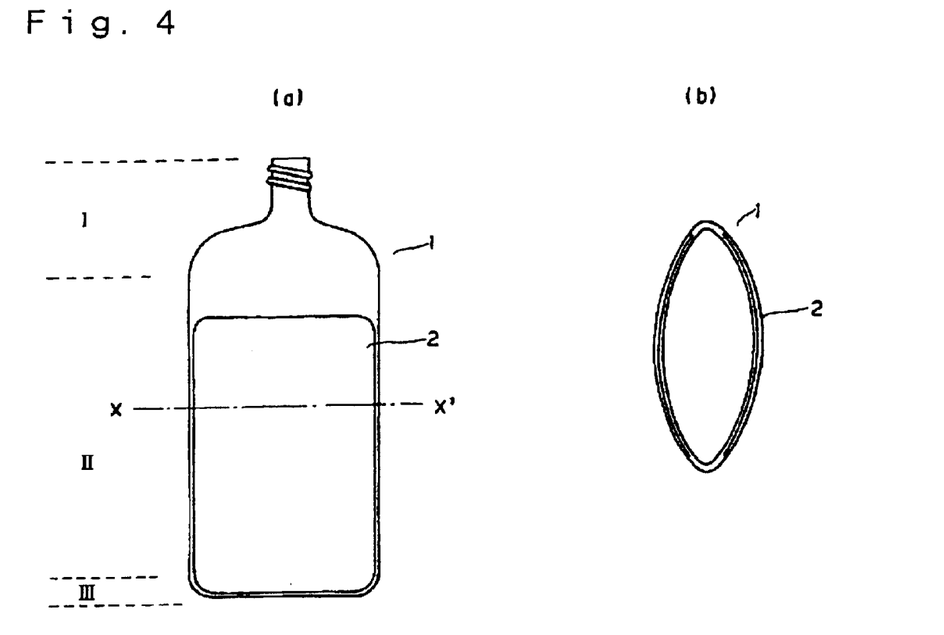
FIG. 4A is a schematic drawing of a 500-ml flat resin bottle having a label placed thereon and fused therewith.
FIG. 4B is a sectional view at the barrel portion thereof along the line X–X'.

In Example 7, and Comparative Examples 8 and 9, a single-layered resin bottle was formed by using a metallocene-polyethylene (foregoing KF360) as material 4 for forming the bottle, and by using a die and a small-sized direct blow molding machine (product of Tahara K.K., model TL5543L) for forming a 500-ml flattened bottle shown in FIG. 4, where adjustment of the lip distance of the die and parison control were properly effected at 150° C.

In practice, all resin bottles were first produced without the labels placed thereon, base weights thereof were measured, allowed to stand for one day in a thermostatic chamber conditioned at 23° C., filled with water of 23° C. up to the upper limit of the mouth portion of the bottles, and the fill-in volume V (ml) was estimated based on the amount of filled water, and the $W/(V^{2/3})$ value was obtained based on such volume V and base weight (g). Results were shown in Table 2.

The individual labels were cut in a size of 100 mm wide and 150 mm long so as to have rounded corners, where the label 1 obtained in the Production Example was used in Example 7, and label 3 obtained in Production Example was used in Comparative Example 8. Each half portion of a parted die was then inserted with one each of such label before both half portions are closed, and the labels were immobilized on the inner wall of the cavity and then placed on the resultant resin bottle as being arranged along the circumferential direction of the barrel portion and as being not overlapped with each other.

The self-standing property of the bottle was then evaluated. More specifically, the resin bottle filled with 500 ml of water was allowed to stand upright, applied with horizontal stress at the mouth portion in a direction normal to a plane including the die parting line of the bottle to thereby incline such bottle and kept in such state. Whether the bottle tumbles or restores was assessed according to the criteria below:

O: the bottle restores the initial upright position after being inclined by 10 to 20° from the vertical direction and released; and X: the bottle tumbles after being inclined by 10 to 20° from the vertical direction and released.

TABLE 1

| | Bottle | | | | Label | | Assessment | |
|---|---|---|---|---|---|---|---|---|
| | Material | Bottle shape | $W/(V^{2/3})$ | Thickness ratio of barrel portion | Type | Tensile elastic modulus (kgf/cm²) | Buckling strength (kgf) | Volume reducing property |
| Example 1 | material 1 | FIG. 1 | 0.45 | 0.63 | (1) | 16,000 | 52.4 | O |
| Example 2 | | | 0.45 | 0.63 | (2) | 24,000 | 57.5 | O |
| Example 3 | | | 0.36 | 0.65 | (1) | 16,000 | 45.5 | O |
| Example 4 | | | 0.37 | 0.42 | (1) | 16,000 | 50.1 | O |
| Comparative Example 1 | | | 0.71 | 0.96 | — | — | 63.9 | X |
| Comparative Example 2 | | | 0.45 | 0.63 | — | — | 34.4 | O |
| Comparative Example 3 | | | 0.45 | 0.63 | (3) | 4,500 | 37.7 | O |
| Comparative Example 4 | | | 0.37 | 0.42 | — | — | 31.5 | O |
| Example 5 | material 2 | FIG. 2 | 0.40 | 0.61 | (1) | 16,000 | 35.2 | O |
| Comparative Example 5 | | | 0.66 | 0.92 | — | — | 43.9 | X |
| Comparative Example 6 | | | 0.4 | 0.61 | — | — | 29.8 | O |
| Example 6 | material 3 | FIG. 3 | 0.32 | 0.78 | (1) | 16,000 | 38.9 | O |
| Comparative Example 7 | | | 0.32 | 0.78 | — | — | 31.7 | O |

Results were shown in Table 2.

The individual labeled resin bottles were also examined for their haderability in content transfer process. More specifically, each resin bottle was filled with 500 ml of water and the water was then transferred into a commercial shampoo bottle produced by blow molding, where the handerability was assessed according to the following criteria:

O: the bottle allows balanced holding by hand, easy contact between the outlet spout thereof with an inlet spout of the empty bottle, and easy transfer of water within a short time without spilling it;

Δ: while the bottle tends to slightly cave in at the barrel portion when held by hand, and causes a slight difficulty in contacting and positioning the outlet spout thereof in respect to an inlet spout of the empty bottle, water can be transferred relatively in a simple manner without spilling it; and X: the bottle does not allow easy holding by hand since it is very likely to cave in, and cannot ensure balanced contact and positioning of the outlet spout in respect to the inlet spout of the empty bottle, so that the transfer will be time-consuming and will cause accidental spilling.

Results were shown in Table 2.

Thus obtained individual labeled resin bottles were also examined for their drop impact strength. More specifically, each resin bottle was filled with 500 ml of water, sealed, allowed to stand for 24 hours in a thermostatic chamber conditioned at 23° C., and then perpendicularly dropped onto a concrete plane while directing the bottom downward from a height of 0.5 m which increases in 0.5-m steps, where a height causative of fracture of any one bottle out of five bottles dropped from the same height was recorded. Results were shown in Table 2.

Thus obtained individual labeled resin bottles were also evaluated for their volume reducing property. More specifically, the barrel portion thereof was squashed by hand, and impression of easiness of such squashing and resultant deformation status of the resin bottles were assessed according to the criteria below:

O: the bottle can readily be squashed at the barrel portion and deforms to an extent that almost no content volume remains; and X: the bottle can readily be squashed at the barrel portion, but can be deformed only to an incomplete extent that the content volume slightly remains.

Results were shown in Table 2.

Example 8

The bottle was molded and assessed similarly to Example 7 using a blended composition comprising 50 wt % of a metallocene-polyethylene (product of Japan Polychem Corporation, Kernel KS560, MFR at 190° C. and 2.16 kg load=16.5 g/10 min., density=0.895 g/cm$^3$, stiffness according to JIS K7106=400 kgf/cm$^2$) and a low-density polyethylene (Japan Polychem Corporation, Novatec LD LF122, MFR at 190° C. and 2.16 kg load=0.3 g/10 min., density= 0.923 g/cm$^3$, stiffness according to JIS K7106=2,000 kgf/cm$^2$) as material 5 for forming the bottle. Results were shown in Table 2.

Comparative Example 10

The bottle was molded and assessed similarly to Example 7 using a high-density polyethylene (Japan Polychem Corporation, Novatec HD HB431, MFR at 190° C. and 2.16 kg load=35 g/10 min., density=0.957 g/cm$^3$) as material 6 for forming the bottle. Results were shown in Table 2.

Comparative Example 11

Figure 5:
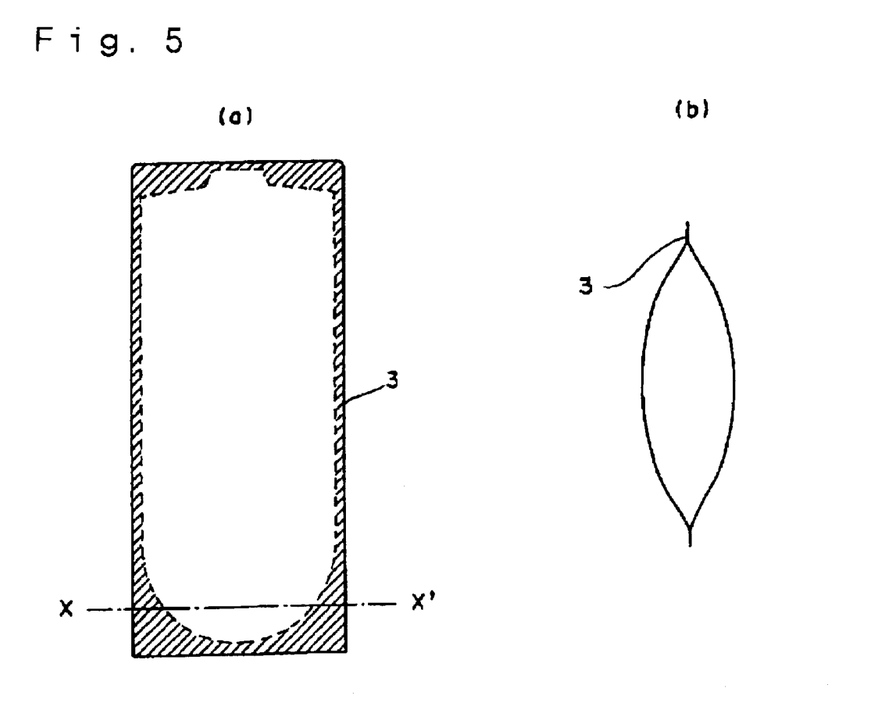
FIG. 5A is a front elevation of a typical commercial standing pouch for packaging refill produced by heat-sealing.
FIG. 5B is a sectional view along the line X–X', where reference numeral 3 represents a heat-sealed section.

A commercial 500-ml standing pouch for packaging liquid detergent refill as shown in FIG. 5 was purchased, and base weight of the empty pouch, $W/(V^{2/3})$ value, self-standing property, handerability in transfer, drop impact strength, and volume reducing property were assessed similarly to Example 7 assuming the pouch as the bottle. Results were shown in Table 2.

TABLE 2

| | Bottle | | | | | Label | | Assessment | | | |
| | | | | | | Tensile | | | | | |
| | Material | Stiffness (kgf/cm$^2$) | Bottle shape | Base Weight (g) | $W/(V^{2/3})$ | Type | elastic modulus (kgf/cm$^2$) | Self-standing property | Handerability in transfer | Drop impact strength | Volume reducing property |
|---|---|---|---|---|---|---|---|---|---|---|---|
| Example 7 | Material 4 | 430 | FIG. 4 | 13.2 | 0.21 | (1) | 16,000 | O | O | ≧3 m | O |
| Example 8 | Material 5 | 1,200 | FIG. 4 | 13.9 | 0.22 | (1) | 16,000 | O | O | ≧3 m | O |
| Comparative Example 8 | Material 4 | 430 | FIG. 4 | 13.2 | 0.21 | — | — | X | Δ | ≧3 m | O |
| Comparative Example 9 | Material 4 | 430 | FIG. 4 | 13.2 | 0.21 | (3) | 4,500 | X | Δ | ≧3 m | O |
| Comparative Example 10 | Material 6 | 11,000 | FIG. 4 | 15.6 | 0.25 | — | — | O | O | 0.5 m | X |
| Comparative Example 11 | — | — | FIG. 5 | 13.3 | (0.21) | — | — | O | X | ≧3 m | O |

Example 9

The fine-porous stretched resin film produced in Production Examples of 1 to 3 were individually punched in a size of 120 mm long and 20 mm wide, to thereby produce a label for in-mold forming.

Figure 6:
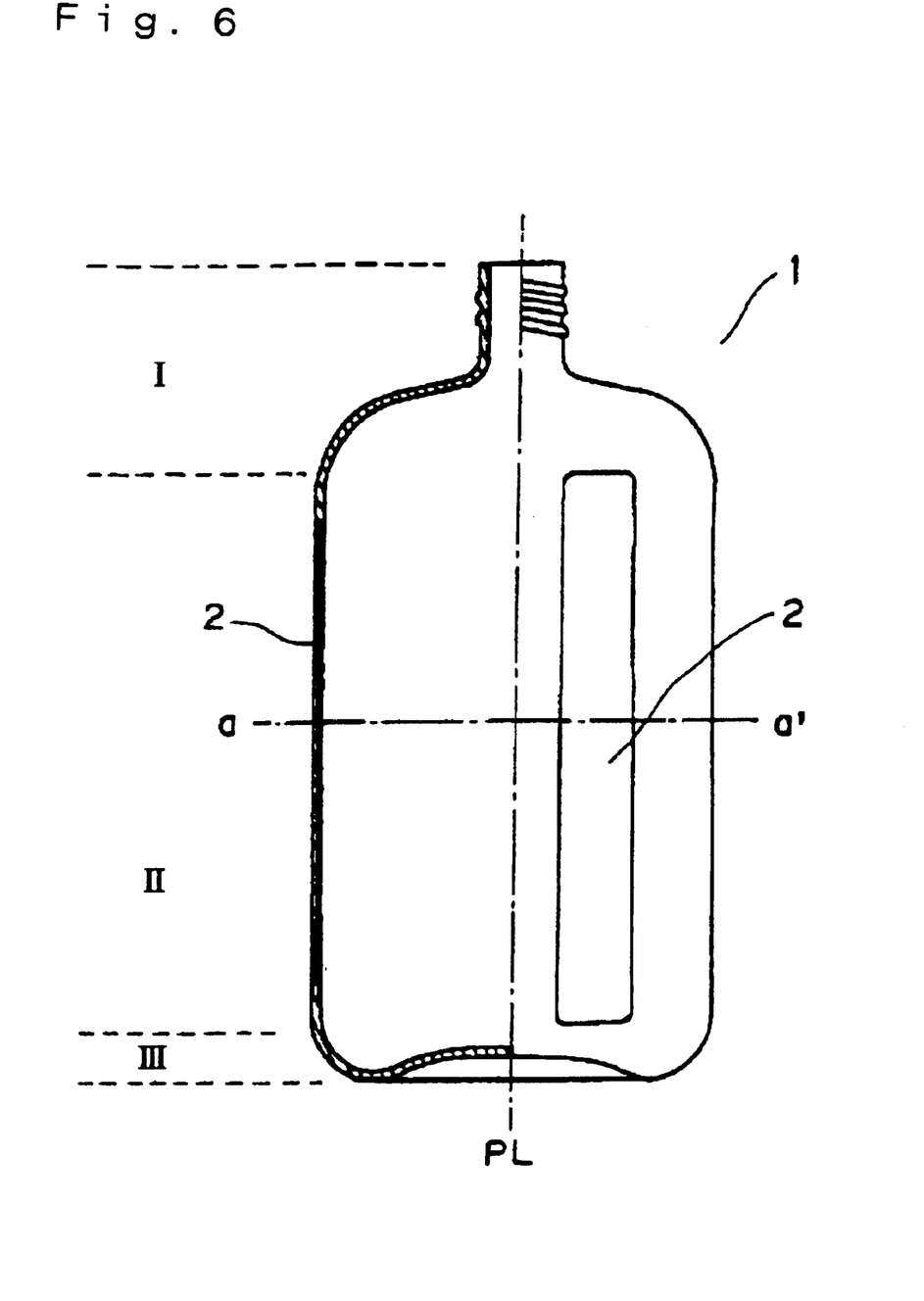
FIG. 6 is an overall front elevation of a round bottle having four labels placed thereon and fused therewith, where symbol a represents the central point in the height-wise (vertical) direction of the barrel portion of the bottle, a' represents a point opposite to the central point a, and P.L. represents a parting line of a blow molding die.
Figure 7:
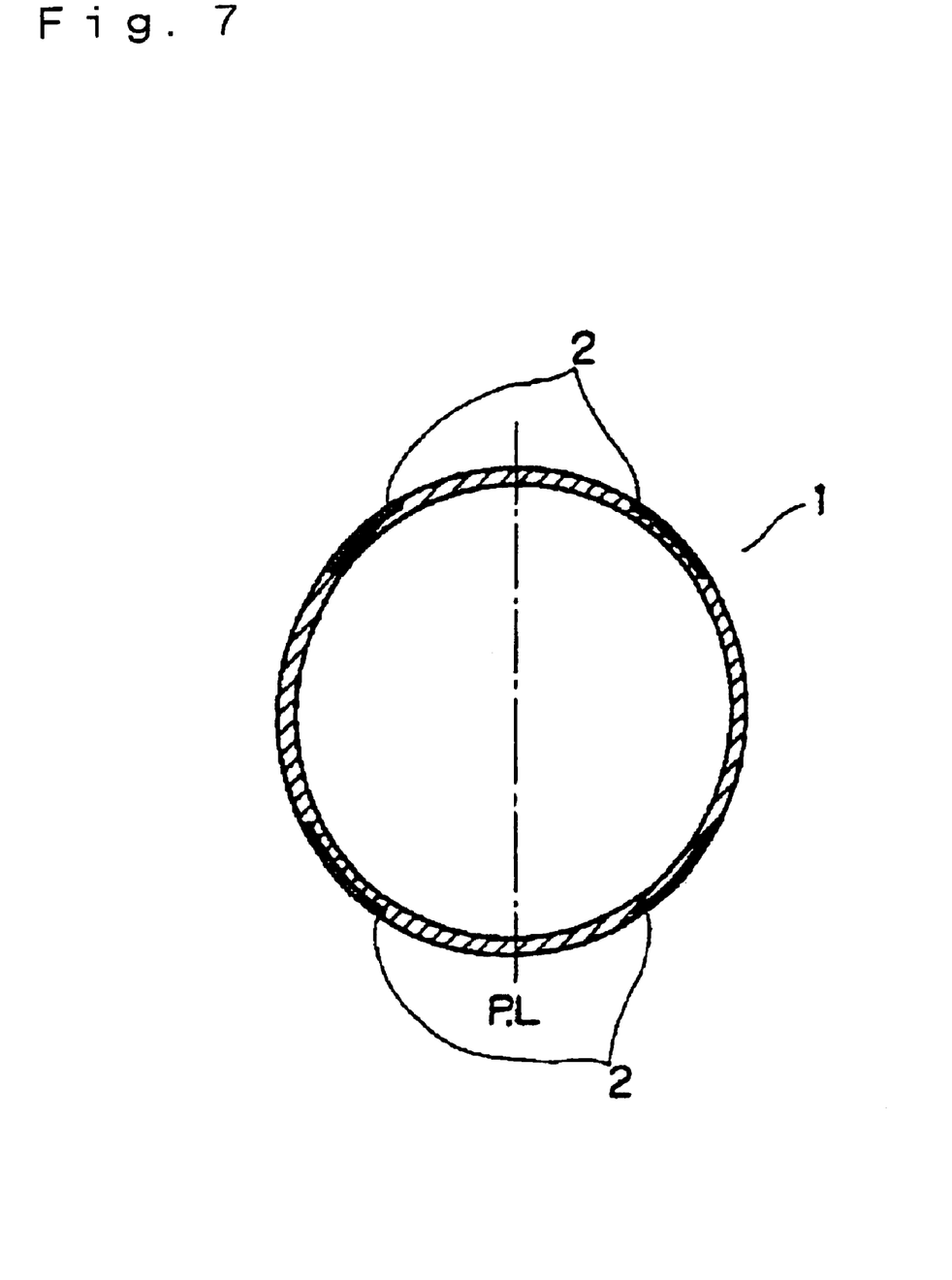
FIG. 7 is a sectional view at the barrel portion along the line a–a' in FIG. 2.

A single-layered resin bottle was formed by using a high-density polyethylene (ditto BB330) for forming the bottle, and by using a die and a small-sized direct blow molding machine (product of Tahara K.K., model TL5543L) for forming a 500-ml bottle having a height of 200 mm and a round transverse cross-section at the barrel portion as shown in FIG. 6, where adjustment of the lip distance of the die and parison control were properly effected at 200° C. and four labels were fused on the bottle by the in-mold forming process as shown in FIGS. 6 and 7. The resin bottle having no label placed thereon was also produced for comparison.

The obtained labeled resin bottle was compressed down by hand from the top potion to thereby assess the buckling strength. It was confirmed that the labeled resin bottle was remarkably higher in the strength than the non-labeled resin bottle. It was also found that the buckling deformation starts at the barrel portion.

On the other hand, easiness of squashing the bottle was examined by squashing the barrel portion by hand, which revealed that no significant difference in the impression of easiness of the squashing was found between the labeled resin bottles and non-labeled resin bottles.

Placing and fusing the label having a tensile elastic modulus of about 5,000 to 30,000 kgf/cm² onto the resin bottle having a $W/(V^{2/3})$ value within a range from about 0.3 to 0.5 according to the present invention can successfully provide a labeled resin bottle having a buckling strength which is largely improved as compared to that of the non-labeled resin bottle, while light weight and excellent volume reducing property thereof are also attained.

In another aspect, placing and fusing the label having a tensile elastic modulus of about 5,000 to 30,000 kgf/cm² onto the resin bottle, in which a polyolefinic resin layer having a stiffness of about 5,000 kgf/cm² or below accounts for a major portion in the thickness constitution and a value of $W/(V^{2/3})$ is about 0.1 or larger and smaller than 0.3, can successfully provide a labeled resin bottle excellent in self-standing property, handerability in transfer process, drop impact strength and volume reducing property, and is substitutable for the conventional self-standing pouch.

Having described the present invention, it will be apparent to one of ordinary skill in the art that many changes and modifications may be made to the above-described embodiments without departing from the spirit and scope of the present invention.

What is claimed is:

1. A labeled resin bottle, comprising a resin bottle and one or more labels placed thereon and fused therewith, wherein said resin bottle has a value of $W/(V^{2/3})$ within a range from about 0.1 to 0.5, wherein W is a base weight thereof, and V is a fill-in volume, thereof, provided that when the value is about 0.1 or larger and smaller than about 0.3, the bottle has a major thick layer consisting essentially of a polyolefinic resin having a stiffness of about 5,000 kgf/cm² or below, and wherein said label has a tensile elastic modulus of about 5,000 to 30,000 kgf/cm², wherein the resin bottle comprises a mouth/shoulder portion, a barrel portion and a bottom portion, and the thickness ratio of the barrel portion in respect to a minimum thickness of the mouth/shoulder portion and the bottom portion including a bottom corner portion is within a range of from about 0.1 to 0.9.

2. The labeled resin bottle of claim 1, wherein the tensile elastic modulus of the label is about 10,000 to 25,000 kgf/cm².

3. The labeled resin bottle of claim 1, wherein the label contains polypropylene-base resin.

4. The labeled resin bottle of claim 1, wherein the thickness ratio is thin a range from about 0.2 to 0.8.

5. The labeled resin bottle of claim 1, wherein three or more discontinuous labels are placed on the resin bottle so as to be aligned along the peripheral direction of the lateral section of the barrel portion, and fused by in-mold forming along the vertical direction of the barrel portion.

6. The labeled resin bottle of claim 1, having a sectional shape of polygons higher than square and having said one or more labels placed on an edge thereof, said edge being a chamfered edge having a chamfering radius of 5 mm or above.

7. The labeled resin bottle of claim 1, wherein the label is capable of being used for in-mold forming, comprising a thermoplastic resin film base layer having on one surface thereof a heat-sealing resin layer which is to be faced to the resin bottle, thereby allowing the label to be fused therewith.

8. The labeled resin bottle of claim 7, wherein the thermoplastic resin film base layer comprises a fine porous stretched resin film containing an inorganic or organic fine powder.

9. The labeled resin bottle of claim 7, wherein the heat-sealing resin layer is embossed.

10. The labeled resin bottle of claim 1, wherein the label has a thickness of about 40 to 250 μm.

11. The labeled resin bottle of claim 10, wherein the label has a thickness of 50 to 200 μm.

12. The labeled resin bottle of claim 1, wherein the value of $W/(V^{2/3})$ of the resin bottle is within a range of from about 0.3 to 0.5.

13. The labeled resin bottle of claim 12, wherein the barrel portion has a primary curved surface, and the label is placed on such primary curved surface.

14. The labeled resin bottle of claim 13, wherein the primary curved surface composing the barrel portion is responsible for the start of deformation when compressive load is applied from the mouth portion of the resin bottle.

15. The labeled resin bottle of claim 12, wherein the resin bottle is produced by direct blow molding using a polyolefinic resin as a major material.

16. The labeled resin bottle of claim 12, wherein the resin bottle is produced by injection stretching blow molding using a polyolefinic resin as a major material.

17. The labeled resin bottle of claim 12, which comprises three or more discontinuous labels thereon.

18. The labeled resin bottle of claim 17, wherein said three or more discontinuous labels are placed on the resin bottle so as to be aligned along a peripheral section of a lateral section of the barrel portion; and fused by in-mold forming along a vertical direction of the barrel portion.

19. The labeled resin bottle of claim 17, which comprises three to six discontinuous labels thereon.

20. The labeled resin bottle of claim 1, wherein a value of $W/(V^{2/3})$ of the resin bottle is within a range from about 0.1 or above and less than about 0.3.

21. The labeled resin bottle of claim 20, wherein the resin bottle is self-standing.

22. The labeled resin bottle of claim 20, wherein the polyolefinic resin is composed mainly of an ethylene-α-olefinic copolymer which is polymerized using a methallocene-base catalyst and has a density of about 0.850 to 0.915 g/cm³.

23. The labeled resin bottle of claim 22, wherein the metallocene-base catalyst is a metallocene-alumoxane catalyst or a mixture of a metallocene compound and a compound capable of forming a stable anion by reacting therewith.

* * * * *